(12) United States Patent
Schnell et al.

(10) Patent No.: US 10,769,093 B2
(45) Date of Patent: *Sep. 8, 2020

(54) AUTOMATICALLY CONFIGURING A UNIVERSAL SERIAL BUS (USB) TYPE-C PORT OF A COMPUTING DEVICE

(71) Applicant: Dell Products L. P., Round Rock, TX (US)

(72) Inventors: Arnold Thomas Schnell, Hutto, TX (US); Lee B. Zaretsky, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,266

(22) Filed: Feb. 21, 2019

(65) Prior Publication Data

US 2019/0188180 A1 Jun. 20, 2019

Related U.S. Application Data

(63) Continuation of application No. 15/244,539, filed on Aug. 23, 2016, now Pat. No. 10,268,627.

(51) Int. Cl.
*G06F 13/20* (2006.01)
*G06F 13/42* (2006.01)
*G06F 13/40* (2006.01)

(52) U.S. Cl.
CPC ...... *G06F 13/4282* (2013.01); *G06F 13/4022* (2013.01)

(58) Field of Classification Search
None
See application file for complete search history.

(56) References Cited

U.S. PATENT DOCUMENTS

2016/0127671 A1* 5/2016 Hundal ............... G06F 13/4247
348/723

OTHER PUBLICATIONS

Universal Serial Bus Type-C cable and Connector Specification Rev. 1.1., Apr. 3 2015, pp. 1-180 (Year: 2015).*
Wikipedia, Processor Register, Jun. 18, 2004, p. 1.*

* cited by examiner

*Primary Examiner* — Henry Tsai
*Assistant Examiner* — Dean Phan
(74) *Attorney, Agent, or Firm* — Campbell Stephenson LLP; Shiv S. Naimpally

(57) ABSTRACT

In some implementations a logic device, such as an embedded controller, automatically configures a universal serial bus (USB) Type-C port by connecting the USB Type-C port to appropriate input/output (I/O) signals. For example, the logic device may receive a notification that an external device is connected to a USB Type-C port of a computing device. The logic device may receive data from a port controller over an internal communication bus associated with the USB Type-C port. Based at least in part on the data, the logic device may determine one or more types of signals that the external device is configured to send, receive, or send and receive. The logic device may instruct a cross-point switch to connect the USB Type-C port to one or more signal paths in the computing device to enable the external device to send/receive the one or more types of signals.

20 Claims, 6 Drawing Sheets

AUTOMATICALLY CONFIGURING A UNIVERSAL SERIAL BUS (USB) TYPE-C PORT OF A COMPUTING DEVICE

CROSS-REFERENCE TO RELATED APPLICATIONS

The present patent application is a continuation of U.S. patent application Ser. No. 15/244,539 filed on Aug. 23, 2016 entitled "Automatically Configuring A Universal Serial Bus (USB) Type-C Port of a Computing Device" and is incorporated by reference herein in its entirety and for all purposes as if completely and fully set forth herein.

BACKGROUND OF THE INVENTION

Field of the Invention

This invention relates generally to Universal Serial Bus (USB) Type-C and, more particularly, to automatically configuring a USB Type-C port of a computing device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The USB Type-C ("USB-C") specification includes support for guest protocols, thereby enabling a wide variety of signals to be transported using USB-C. Prior to USB-C, data and video were segregated and transported on different physical connectors. For example, prior to USB-C, data was transported using interfaces such as USB Type-A, USB Type-B, or Ethernet, while video was transported using interfaces such as Display Port (DP), mini-DP (mDP), Video Graphics Array (VGA), or High-Definition Multimedia Interface (HDMI). When data and video are segregated in this manner, consumers know, based on the physical connector, which port to use to connect a device, e.g., an Ethernet cable could only be connected to an Ethernet connector (e.g., port), an HDMI cable could only be connected to an HDMI connector, etc. In contrast, Type-C can transport many types of signals, including data, video, and others (e.g., USB, DP, Peripheral Component Interconnect Express (PCIe), Thunderbolt, and the like), e.g., any protocol that can fit within 8 physical connector pins.

If the variety of ports (e.g., USB Type-A, Ethernet, HDMI, etc.) on a computing device are replaced by a row of USB-C connectors that are identical in appearance, consumers may find it confusing to determine which port to plug a cable into. In the past, a consumer who desired to connect a display device (e.g., a computer monitor) to the computing device might use a VGA cable, an HDMI cable, or a DP cable to plug the cable into a VGA port, an HDMI port, or a DP port, respectively. In other words, each type of port was physically unique so the consumer could only plug a video cable into the corresponding video port, e.g. an HDMI cable could only be plugged into an HDMI port. However, with USB-C ports, the same physical port may be used to carry a wide variety of signals. For example, a computing device may have three USB-C ports, with the first USB-C port configured to handle USB storage data, the second USB-C port configured to handle Ethernet data, and the third USB-C port configured to handle video data (e.g., HDMI-based signals). A consumer who desires to connect a display device to the computing device using a cable terminated with a USB-C plug may attach the cable to any one of the three USB-C ports. If the consumer plugs the USB-C cable into the first port or the second port, the display device is not connected to a port configured to handle video data and so video data is not displayed on the display device. The consumer may become frustrated because the USB-C cable plugs into the USB-C port on the computing device but does not fulfill the expectation of connecting the display device to the computing device, e.g., because not all the ports are configured to handle video data.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A custom logic device, such as an embedded controller, may automatically configure a universal serial bus (USB) Type-C port by connecting the USB Type-C port to appropriate input/output (I/O) signals. For example, the logic device may receive a notification that an external device is connected to a USB Type-C port of a computing device. The logic device may receive data from a port controller over a configuration channel associated with the USB Type-C port. Based at least in part on the data, the logic device may determine one or more types of signals that the external device is able to send, receive, or both send and receive. The logic device may instruct a cross-point switch to connect the USB-C port to one or more signal paths in the computing device to enable the external device to send, receive, or both send and receive the one or more types of signals.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
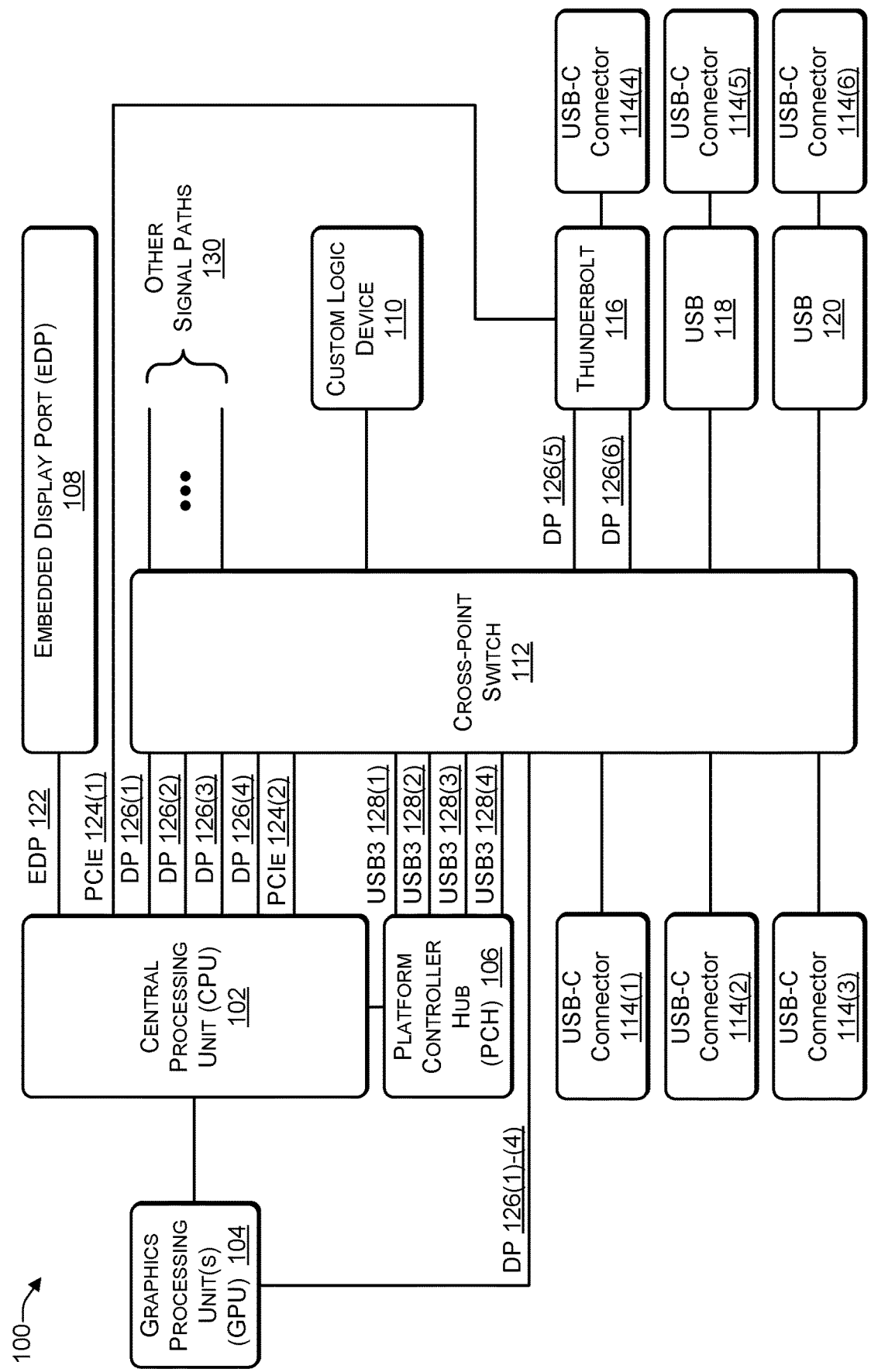
FIG. 1 is a block diagram of an architecture of a computing device with USB-C ports according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may automatically configure USB Type-C (USB-C) ports on a computing device that is part of an information handling system, thereby providing users (e.g., consumers) with "plug and play" functionality. Instead of placing the burden on the consumer to determine which port is configured to perform a particular function (e.g., data, networking, video, etc.), the computer automatically configures a port when an external device is coupled to a USB-C port. For example, when the consumer plugs a cable that is coupled to an external device into a USB-C port, the computing device communicates with the external device, determines what type of function(s) the external device is capable of sending and/or receiving, and routes the correct input/output (I/O) to the USB-C port.

A custom logic device (e.g., an integrated circuit (IC) or the like), implemented using one or more technologies (e.g., embedded controller, field programmable gate array (FPGA), microcontroller with custom firmware, or other programmable logic device) may monitor the internal communication bus (ICB) associated with individual USB-C ports in a computing device. When an external device is attached (e.g., via a cable) to a particular one of the USB-C ports, the custom logic device may monitor the ICB to determine what type of signal(s) (e.g., power, data, video, audio, etc.) the external device is configured to send, receive, or both. Based on the information provided via the ICB, the custom logic device may send an instruction to a cross-point switch to connect the particular USB-C port appropriately to enable the external device to send and/or receive the type of signal(s) the external device is capable of sending and/or receiving. For example, if the custom logic device determines (e.g., via the information on the ICB) that the external device is a display device that is configured to receive a digital video signal, the custom logic device may instruct the cross-point switch to connect the particular USB-C port to the video output of (i) a dedicated graphics processing unit (GPU) or (ii) a central processing unit (CPU) that includes graphics capabilities. As another example, if the custom logic device determines that the external device is a storage device, the custom logic device may send an instruction to the cross-point switch to connect the particular USB-C port to a device bus that supplies compatible input/output (I/O) signals to the storage device and adds the storage device as a device whose file system is accessible to the computing device.

Thus, when a user connects an external device to a USB-C port via a USB-C cable, the custom logic device may monitor the ICB to determine a particular type of signal(s) the external device is configured to send and/or receive. Based on the determination, the custom logic device may send an instruction to a cross-point switch to connect the USB-C port internally (e.g., within the computing device) in such a way as to enable the external device to send and/or receive the particular type of signal(s). In this way, the user may experience "plug and play" because the user can plug (e.g., connect) the external device to any one of the available USB-C ports on the computing device and the custom logic device automatically configures the USB-C port according to the capabilities of the external device. The user does not have to determine which port is configured to perform which function, thereby providing the user with a satisfying, frustration-free experience.

FIG. 1 is a block diagram of an architecture of a computing device 100 that includes USB-C ports according to some embodiments. The computing device 100 includes a CPU 102. In some implementations, a dedicated GPU 104 may be coupled to the CPU 102. If the dedicated GPU 104 is not present in the computing device 100, the GPU 104 may be included within the CPU 102. The CPU 102 may be coupled to a platform hub controller (PCH) 106 and an embedded display port (eDP) 108.

A custom logic device 110 may be coupled to a cross-point switch 112. The cross-point switch 112 may be coupled to multiple USB-C connectors 114, such as, for example, USB-C connectors 114(1), 114(2), and 114(3). One or more of the USB-C connectors 114 may support a Thunderbolt interface (e.g., Thunderbolt 3). For example, as illustrated in FIG. 1, USB-C connector 114(4) may support Thunderbolt 116. Thunderbolt 116 may be coupled to the cross-point switch 112 using two DP lanes, e.g., DP 126(5) and DP 126(6) and one or more Peripheral Component Interconnect Express (PCIe) buses 128. USB-C connectors 114(5) and 114(6) may use USB 118 and USB 120, respectively. In some cases, the cross-point switch 112 may select between (i) USB (e.g., power and data transmittal) signals and (ii) a display port (DP), e.g., digital video signal, for one or more ports, such as the USB ports 118 and 120. While six USB-C connectors (e.g., ports) are illustrated in FIG. 1, it should be understood that fewer than six or greater than six connectors may be implemented using the systems and techniques described herein.

The eDP 108 may receive video data from the CPU 102 via an EDP 122 connection. A Peripheral Component Interconnect Express (PCIe) 124(1) connection may connect the CPU 102 to the Thunderbolt 116. A PCIe 124(2) connection may connect the CPU 102 to the cross-point switch 112. Multiple DP connections, such as DP 126(1), DP 126(2), DP 126(3), and DP 126(4), may connect the CPU 102 or the GPU 104 to the cross-point switch 112. Multiple USB 3 connections, such as USB3 128(1), USB3 128(2), USB3 128(3) and USB3 128(4) may connect the PCH 106 to the cross-point switch 112.

When a user connects an external device to one of the USB-C connectors 114, such as USB-C connector 114(1), a port controller associated with the USB-C connector 114(1) may communicate via the configuration channel (CC) with an external port controller in the external device to determine which type of signal(s) the external device is configured to send, receive, or both send and receive. The port controller associated with the USB-C connector 114(1) may provide information as to the type of signal(s) the external device is configured to send and/or receive via a configuration channel (CC) associated with the USB-C connector 114(1). The custom logic device 110 continually communicates with the port controller associated with each of the USB-C connectors (as described in more detail in the description of FIG. 2) to determine the information regarding the type of signal(s) the external device is configured to send and/or receive. In response to determining the information, the custom logic device 110 may send an instruction to the cross-point switch 112 to switch a signal path associated with the USB-C connector 114(1) to enable the external device to send and/or receive the expected type of signal(s). In this way, the computing device 100 is able to automatically configure individual USB-C connectors 114 according to the expectations of an external device. For example, if the external device is a display device that is configured to receive a video signal, the custom logic device 110 may send an instruction to the cross-point switch 112 to connect the USB-C connector 114(1) to one of the DP 126 outputs from the CPU 102. If the external device is a USB storage device that is configured to send and/or receive data as well as receive power, the custom logic device 110 may send an instruction to the cross-point switch 112 to connect the USB-C connector 114(1) to one of the USB3 128 outputs from the PCH 106.

The custom logic device 110 instructs the cross-point switch 112 to route USB-C input/output (I/O) lines (e.g., carrying signals, power, or both) in response to detecting that an external device has been connected to one of the USB-C connectors 114, thereby providing a plug-n-play experience. Further, USB, DP, or PCIe may be allocated after the external device is connected. As described in more detail in FIG. 2, a port controller in one of the USB-C connectors 114 may send an I/O request to the custom logic device 110, and the custom logic device 110 then instructs the cross-point switch 112 to route the correct I/O to the appropriate one of the USB-C connectors 114.

The cross-point switch 112 may be coupled to other signal paths 130 in addition to the signal paths described above. For example, the other signal paths 130 may include audio signals, video signals, data signals, and other types of signals that can be carried over USB-C.

Thus, the custom logic device 110 may monitor the port controller associated with each of the USB-C connectors via the ICB, determine the type of signal(s) the external device is configured to send and/or receive, and send an instruction to the cross-point switch 112 to switch a signal path associated with the USB-C connector 114(1) to enable the external device to send and/or receive the expected type of signal(s). In this way, a user is provided with a "plug and play" experience. Instead of requiring the user to determine which USB-C port is configured to send/receive which type of signal(s) before plugging in a cable, the user merely plugs the cable into any available USB-C port and the computing device automatically configures the USB-C port to send/receive the type of signals that the external device is capable of sending and/or receiving.

Figure 2:
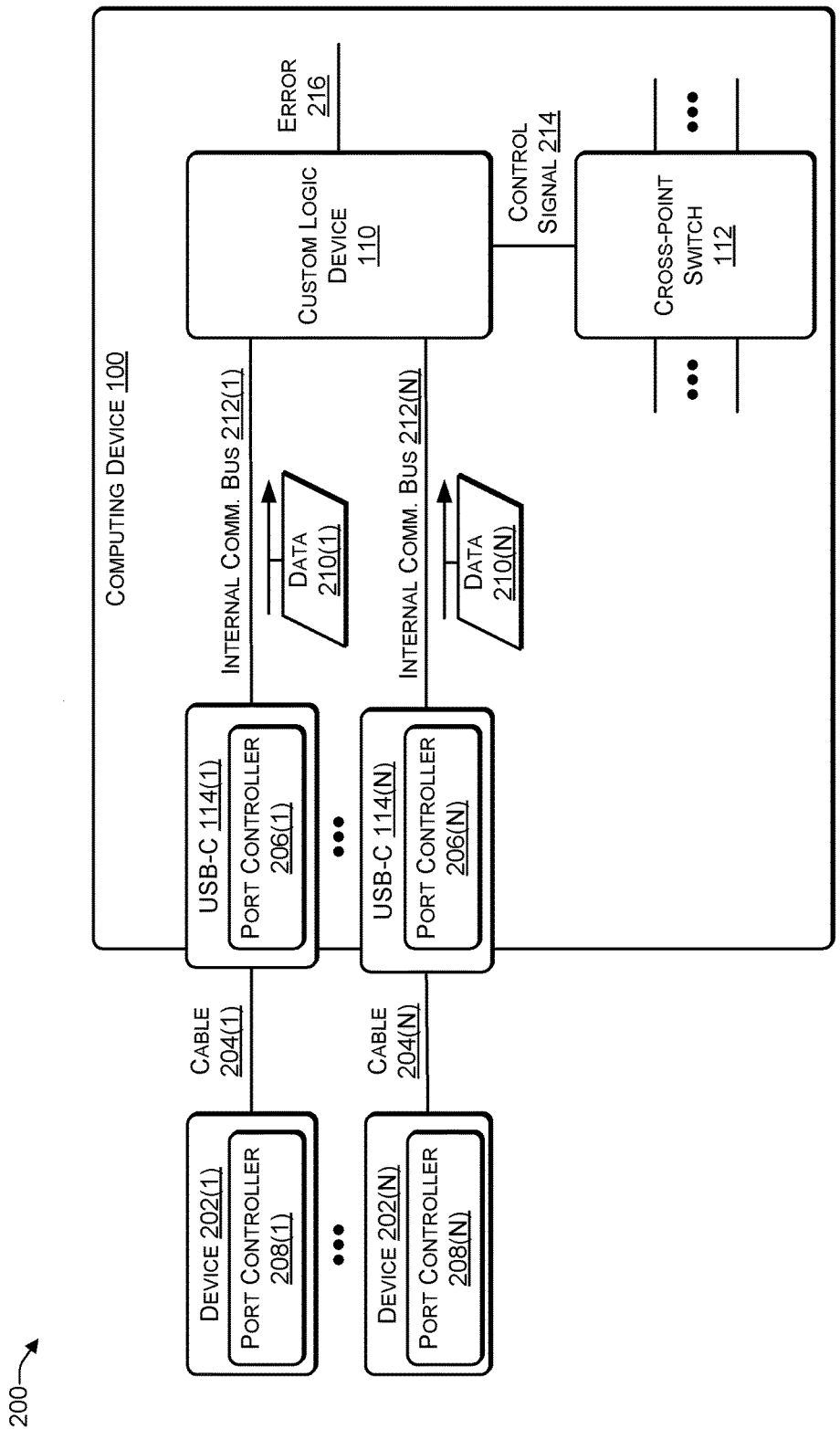
FIG. 2 is a block diagram of an architecture that includes multiple devices connected to USB-C ports according to some embodiments.

FIG. 2 is a block diagram of an architecture 200 that includes multiple devices connected to USB-C ports according to some embodiments. One or more external devices 202(1) to 202(N) (N>0) may be connected to the USB-C connectors 114(1) to 114(N) via a corresponding USB-C cable. For example, the device 202(1) may be connected to the USB-C connector 114(1) via a cable 204(1) and the device 202(N) may be connected to the USB-C connector 114(N) via a cable 204(N). As used herein, the term "connector" refers to the physical USB-C receptacle in a computing device (or in an external device) into which a USB-C cable may be inserted ("plugged in"). As illustrated in FIG. 2, the port controllers are included in the computing device or in the external device.

Each USB-C connector 114 in the computing device 100 may include a port controller. For example, the USB-C connector 114(1) may include a port controller 206(1) and the USB-C connector 114(N) may include a port controller 206(N). The port controllers 206 may support various USB device speeds, including USB 3.1 SuperSpeed+, USB 3.0 SuperSpeed, USB 2.0 Low-speed, Full-speed, and High-speed, USB 1.1 Low-speed and Full-speed, as well as earlier (USB 1.1 and USB 2.0) speeds.

When one of the USB-C cables 204 is used to connect one of the external devices 202 to one of the USB-C connectors 114, a port controller in the USB-C connector 114 may communicate with a port controller included in the external device 202 to determine what type of signal(s) the external device 202 is configured to send, receive, or both. The port controllers 206(1) to 206(N) and 208(1) to 208(N) are connected to configuration channels (e.g., A5 and/or B5 in FIG. 3) and are not in the data flow path. When the USB-C cable 204(1) is used to connect the external device 202(1) to the USB-C connector 114(1), a port controller 206(1) in the USB-C connector 114(1) may communicate with a port controller 208(1) in the external device 202(1) to determine what type of signal(s) the external device 202(1) is configured to send, to receive, or both. Similarly, when the USB-C cable 204(N) is used to connect the external device 202(N) to the USB-C connector 114(N), a port controller 206(N) in the USB-C connector 114(N) may communicate with a port controller 208(N) in the external device 202(N) to determine what type of signal(s) the external device 202(N) is configured to send, to receive, or both.

After determining the type of signal(s) one of the external devices 202 is configured to send and/or receive, one of the port controllers 206 (e.g., into which one of the cables 204 was connected) may send particular data 210 over a particular internal communication bus (ICB) 212 associated with one of the USB-C connectors 114. For example, the port controller 206(1) may communicate with the port controller 208(1), determine what type of signal(s) the device 202(1) is configured to send and/or receive, and provide the data 210(1) over the internal communication bus (ICB) 212(1). The data 210(1) may indicate the type of signal(s) the device 202(1) is configured to send and/or receive. Similarly, the port controller 206(N) may communicate with the port controller 208(N), determine what type of signal(s) the device 202(N) is configured to send and/or receive, and provide the data 210(N) over the ICB 212(N). The data 210(N) may indicate the type of signal(s) the device 202(N) is configured to send and/or receive.

When an external device, such as the device 202(N), is connected to the USB-C connector 114(N) via the cable 204(N), the custom logic device 110 may receive a notification from the port controller 206(N), via the ICB 212(N), that the external device 202(N) has been connected to the USB-C controller 114(N). The custom logic device 110 may receive the data 210(N), via the ICB 212(N), indicating the type of signal(s) that the external device 202(N) is configured to send and/or receive. The custom logic device 110 may analyze the data 210(N) and send a control signal 214 to the cross-point switch 112 to configure the USB-C connector 114(N) to enable the external device 202(N) to send and/or receive the type of signal(s) that the external device 202(N) is configured to send and/or receive. The control signal 214 may send an instruction to the cross-point switch 112 to connect the USB-C connector 114(N) to a component of the computing device 100 that is capable of receiving (and/or sending) the type of signal(s) that the external device 202(N) is configured to send (and/or receive). For example, when the external device 202(N) is a display device that is configured to receive a video signal, the custom logic device 110 may send an instruction to the cross-point switch 112 to connect the USB-C connector 114(N) to a video output (e.g., one of the DP 126 outputs from the CPU 102 of FIG. 1). As another example, when the external device 202(N) is a USB storage device that is configured to send and/or receive data as well as receive power, the custom logic device 110 may send an instruction to the cross-point switch 112 to connect the USB-C connector 114(N) to a USB output (e.g., provided by the PCH 106 of FIG. 1) that provides power and enables data to be read from and/or written to the external device 202(N).

Each of the USB-C connectors 114 may support an Alternate mode and an Accessory mode. A host device (e.g., the computing device 100), an external device (e.g., one of the devices 202), or a cable (e.g., one of the cables 204) may send a vendor defined message (VDM) to exchange information and to discover a USB identifier (ID) associated with the external device. When the host device communicates with the external device and enters into the alternate mode (e.g., via a VDM), the USB-C connector may be configured to support any type of input/output signal, including PCIe or DisplayPort.

Thus, a custom logic device in a computing device may monitor an internal communication bus (ICB) associated with a USB-C connector. When an external device is connected to the USB-C connector, a port controller in the USB-C connector may communicate with a port controller in the external device to determine the type of signal(s) that the external device is capable of sending and/or receiving. The port controller in the USB-C connector may provide, via the configuration channel associated with the USB-C connector, data indicating the type of signal(s) that the external device is capable of sending and/or receiving. Based on the data, the custom logic device 110 may send a control signal to a cross-point switch to connect the USB-C connector to an appropriate component of the computing device to enable the external device to send and/or receive the expected signals. In this way, a user connecting (e.g., plugging in) an external device to a USB-C connector causes the computing device to automatically configure the USB-C connector according to the functionality of the external device. In contrast, without the custom logic device 110, each of the USB-C connectors may be pre-configured to perform a particular function, thereby requiring a user to determine which USB-connector is configured to perform the functions that the external device is capable of performing.

Figure 3:
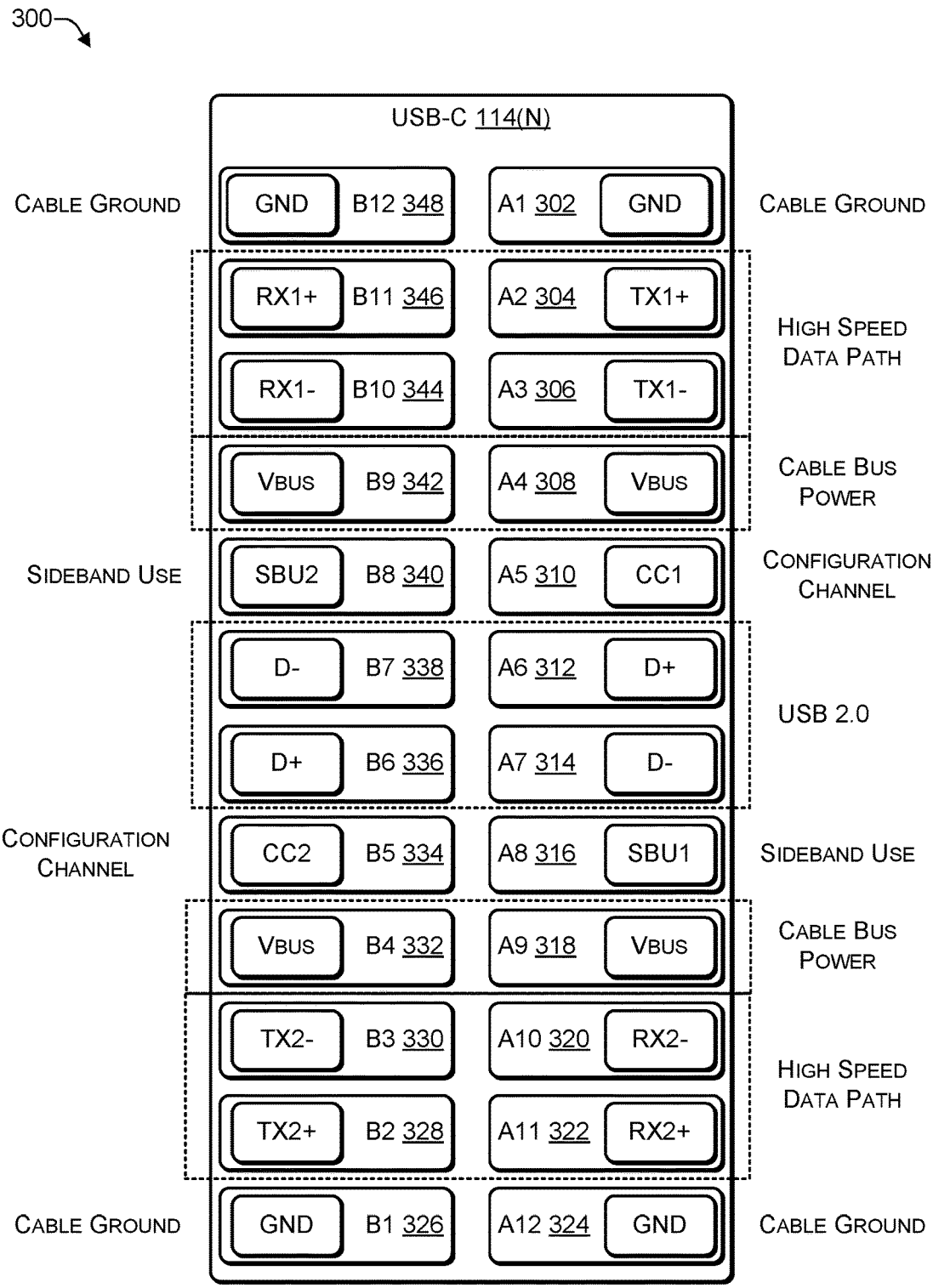
FIG. 3 is a block diagram of an architecture that includes pin assignments of a representative USB-C connector according to some embodiments.

FIG. 3 is a block diagram of an architecture 300 that includes pin assignments of a representative USB-C connector (e.g., receptacle) according to some embodiments. For example, the representative USB-C connector 114(N) includes 24 pins, with an A-side having 12 pins and a B-side having 12 pins. The A-side pins include A1 302, A2 304, A3 306, A4 308, A5 310, A6 312, A7 314, A8 316, A9 318, A10 320, A11 322, and A12 324. The B-side pins include B1 326, B2 328, B3 330, B4 332, B5 334, B6 336, B7 338, B8 340, B9 342, B10 344, B11 346, and B12 348.

A USB cable that is compliant with USB Type-A ("USB-A") and USB Type-B ("USB-B"), is a directional cable, with each end of the cable having a physically different plug. The USB-A connector has a rectangular shape. The USB-B connector has a square shape, while the smaller mini-B and micro-B variants have a trapezoidal shape.

In a USB system, a tree-based structure is formed, with a single USB host at the root (typically the host device, such as a personal computer or laptop), and one or more devices (e.g., memory card etc.) as leaves off of the root. In a conventional USB system, a USB-A connector connects closer to the root, and may be referred to as a downstream facing port (DFP). A USB-B connector connects further away from the root, and may be referred to as an upstream facing port (UFP). Such a tree-based architecture prevents loops and other issues because a user cannot set up an incorrect USB tree due to the physically different connectors.

USB-C replaces both USB-A and USB-B, thereby enabling symmetrical and reversible USB-C cables while maintaining the same tree structure, e.g., one USB host and one or more USB devices. Instead of a using physically different connector and plug to identify the direction of data and power, a USB-C device indicates the device's role (e.g., the device's characteristics, the device's functionality, the type of signals that the device is configured to send and/or receive, and the like) electrically through a Configuration Channel (CC). The CC is used in the discovery, configuration and management of connections across a USB Type-C cable. For example, when an external device is connected to a USB connector of a computing device (e.g., host device), the USB connector may provide discovery data on the CC indicating that an external device has been discovered. The external device negotiates with the host device, via the CC, as to the type (e.g., voltage and amperage) of power delivery to provide, the type of data traffic (e.g., USB 1.0, USB 2.0, number of lanes of DP traffic, etc.) to provide or expect, and the like. The external device and the host device may manage the connection, via the CC, by re-negotiating the power delivery, re-negotiating the type of data traffic, etc.

Pins A1 302, A12 324, B1 326, and B12 348 provide cable ground. Pins A2 304, A3 306, B10 344 and B11 346 may provide a first high speed data path, with the A pins 304, 306 used for transmitting and the B pins 344, 346 used for receiving. When an Alternate mode is specified, pins A2 304, A3 306, B10 344 and B11 346 may be used for video data, such as Display Port (DP). Pins A10 320, A11 322, B2 328 and B3 330 may provide a second high speed data path, with the A pins 320, 322 used for receiving and the B pins 328, 330 used for transmitting. When an Alternate mode is specified, one or more of pins A10 320, A11 322, B2 328 and B3 330 may be used for video data, such as providing up to four lanes of Display Port (DP). Pins A4 308, A9 318, B4 332, and B9 342 may be used to provide cable bus power. Pins A6 312, A7 314, B6 336, and B7 338 may be used to provide USB 2.0 functionality.

Each USB Type-C port has two CC pins, oriented in such a way that regardless of the orientation of the cable, the CC pin in the cable plug connects with one of the two CC pins. Each USB-C cable has a single CC wire. Thus, either pin A5 310 or pin B5 334 may be used as the CC. Typically, one of the pins A5 310 or B5 334 is used as the CC while the other pin is used as Vconn (e.g., to provide power).

A port controller, such as the port controller 206 of FIG. 2, may monitor whichever of the pins A5 310 and B5 334 is being used as the CC to determine the characteristics and functionality of the external device and to determine which type of signal(s) the external device is configured to send and/or receive.

When a DFP (e.g., USB host) is connected to a UFP (e.g., an external USB device) using a cable, the CC on both sides are connected together, and the shared CC line has both a pull-up and a pull-down on it. Both the DFP and UFP read the voltage on the CC line and can recognize that a connection has just been made when the voltage becomes a predictable value. By monitoring the voltage on both pins A5 310 and B5 334, a host or external device can determine an orientation of the USB cable and route the other pins appropriately. There is a pullup resistor Rp on the DFP side and a pulldown resistor Rd on the UFP side. Before an external device is connected to a USB-C port, the DFP VBUS has no output. After an external device is connected to the USB-C port, e.g., connecting the host device (DFP) with the external device (UFP), the CC pin in the DFP detects the voltage drop at the CC pin caused by Rd, thereby notifying the DFP (via the CC) that the UFP has been connected.

Besides DFP and UFP, a dual-role port (DRP) is possible. A DRP can, depending on the circumstances, can automatically (e.g., without human interaction) configure itself as a DFP or as a UFP. For example, when a DRP is connected to a DFP, the DRP can change itself to be a UFP. When the DRP is connected to a UFP, the DRP can change itself to be a DFP. When two DRP are connected together, one DRP will randomly change to be a DFP and the other DRP will change to be a UFP.

In USB-C, the external device can negotiate power delivery, including between 5 volts (default) up to 20 volts and up to 5.0 amps (A). The CC may be used to identify the power capabilities of a host device. Default USB Power uses a 56 kΩ pullup, 1.5 A uses a 22 kΩ pullup, and 3.0 A uses a 10 kΩ pullup. The latter two modes are used for non-legacy USB Type-C ports and cables when the power supply has satisfied the electrical requirements to meet a 1.5 A or 3.0 A load. Default USB Power means 500 milliamps (mA) for USB 2.0 or 900 mA for USB 3.1. Default USB Power also enables negotiating, using the data lines D+ and D−, using any of the protocols that comply with USB A-to-Micro-B cables.

The CC may be used to communicate Vendor Defined Messages (VDMs). An identifier (ID) may be included in a sixteen-bit ID field in each VDM. There are two types of IDs: Standardized ID (SID) and Vendor specific ID (VID). SID and VIDs are assigned by a standards body (e.g., the USB Implementers Forum (USB-IF)). The USB-IF assigns SIDs to standards groups and assigns VIDs to companies. The SID refers to a specific type of alternate mode of operation, such as the Display Port Alternate Mode ("Alt Mode" promulgated by the Video Electronics Standards Association (VESA)) and the Mobile High-Definition Link (MHL) Alt Mode (promulgated by the MHL consortium). Companies can use their unique VID to establish a proprietary link that works between their own UFP and DFP. For example, an external device made by Dell® may establish a proprietary link with a Dell® computing device (e.g., desktop computer, laptop computer, or tablet computer). The proprietary link may be used to provide features that are not available with external devices made by other companies. In order to enter or exit an Alternate (Alt) mode, structured VDMs may be used. The structured VDMs may have well-defined but extensible commands and are modal in behavior. For example, two commands are "Enter Mode" and "Exit Mode." Once an Alt Mode is enabled, specialized commands and data, known as unstructured VDMs, may be used to provide vendor-customized formats.

In some cases, the custom logic device 110 of FIGS. 1 and 2 may determine a device class of the external device and determine the signals that the external device is configured to send and/or receive based on the device class. Examples of USB device classes are provided in Table 1.

TABLE 1

| | USB Device Classes | |
|---|---|---|
| Usage | Device Class | Description (examples) |
| Interface | Audio | Speaker, microphone, sound card, Musical Instrument Digital Interface (MIDI), etc. |
| Both | Communications | Modem, Ethernet adapter, Wi-Fi adapter, RS232 serial adapter, etc. Used with communications device class (CDC) below. |
| Interface | Human interface device (HID) | Keyboard, mouse, joystick, etc. |
| Interface | Physical Interface Device (PID) | Force feedback joystick, haptic feedback device, etc. |
| Interface | Image | Webcam, scanner, and other devices using Media Transfer Protocol (MTP) or Picture Transfer Protocol (PTP) |
| Interface | Printer | Laser printer, inkjet printer, 3D printer, etc. |
| Interface | Mass storage | USB flash drive, memory card reader, digital audio player, digital camera, external drive, and other USB Mass Storage (UMS) devices |
| Device | USB hub | Full bandwidth hub |
| Interface | CDC-Data | Used with Communications above |
| Interface | Smart Card | USB smart card reader etc. |
| Interface | Security | Fingerprint reader, retinal scanner, etc. |
| Interface | Video | Webcam, etc. |

TABLE 1-continued

USB Device Classes

| Usage | Device Class | Description (examples) |
|---|---|---|
| Interface | Personal healthcare device class (PHDC) | Pulse monitor (watch), etc. |
| Interface | Audio/Video (AV) | Webcam, TV |
| Device | Billboard | Describes USB Type-C alternate modes supported by device |
| Both | Diagnostic Device | USB compliance testing device |
| Interface | Wireless Controller | Bluetooth adapter, Remote Network Driver Interface Specification (RNDIS), etc. |
| Both | Miscellaneous | ActiveSync device |
| Interface | Application-specific | IrDA Bridge, USB Test & Measurement Class (USBTMC), USB Device Firmware Upgrade (DFU), etc. |
| Both | Vendor-specific | Indicates that a device needs vendor-specific drivers |

The port controller associated with a USB-C connector is capable of providing several different types of data via the CC. First, the port controller may provide (via the CC) information indicating when an external (e.g., downstream) device is attached or detached. Second, the port controller may provide (via the CC) information as to the role (or device class) of each device, e.g., identifying which is the host device and which is the external (downstream) device. Third, the port controller may provide (via the CC) information identifying an orientation of the USB-C cable. Fourth, the host device and the external device may communicate via the CC to detect and negotiate the amount of power (e.g., amount of amperage, amount of voltage, or both) to be provided via the USB-C cable in accordance with the USB Power Delivery Specification.

Figure 4:
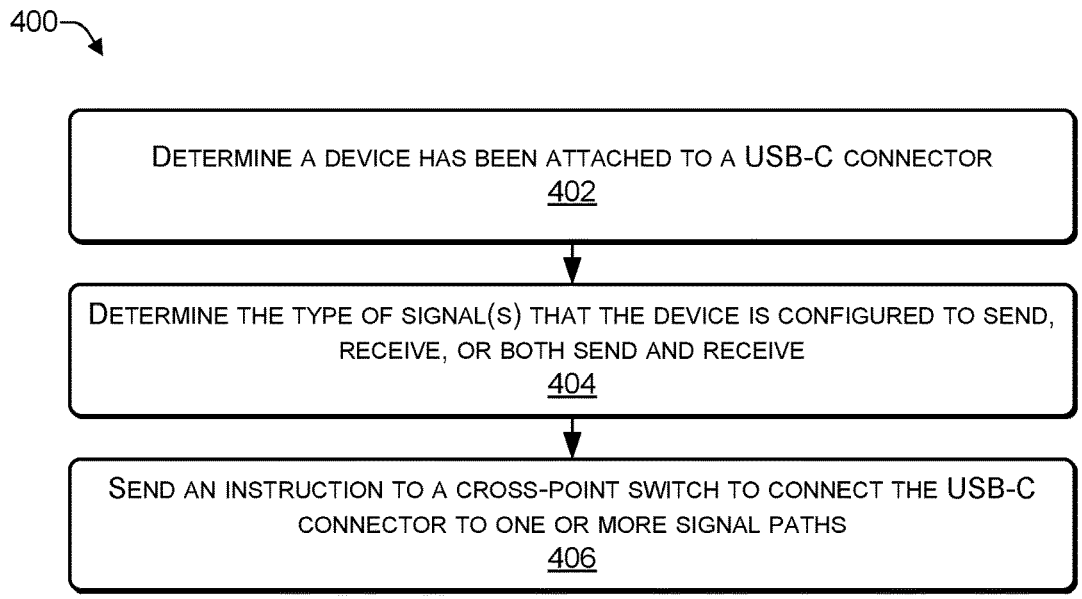
FIG. 4 is a flowchart of a process that includes sending an instruction to a cross-point switch according to some embodiments.
Figure 5:
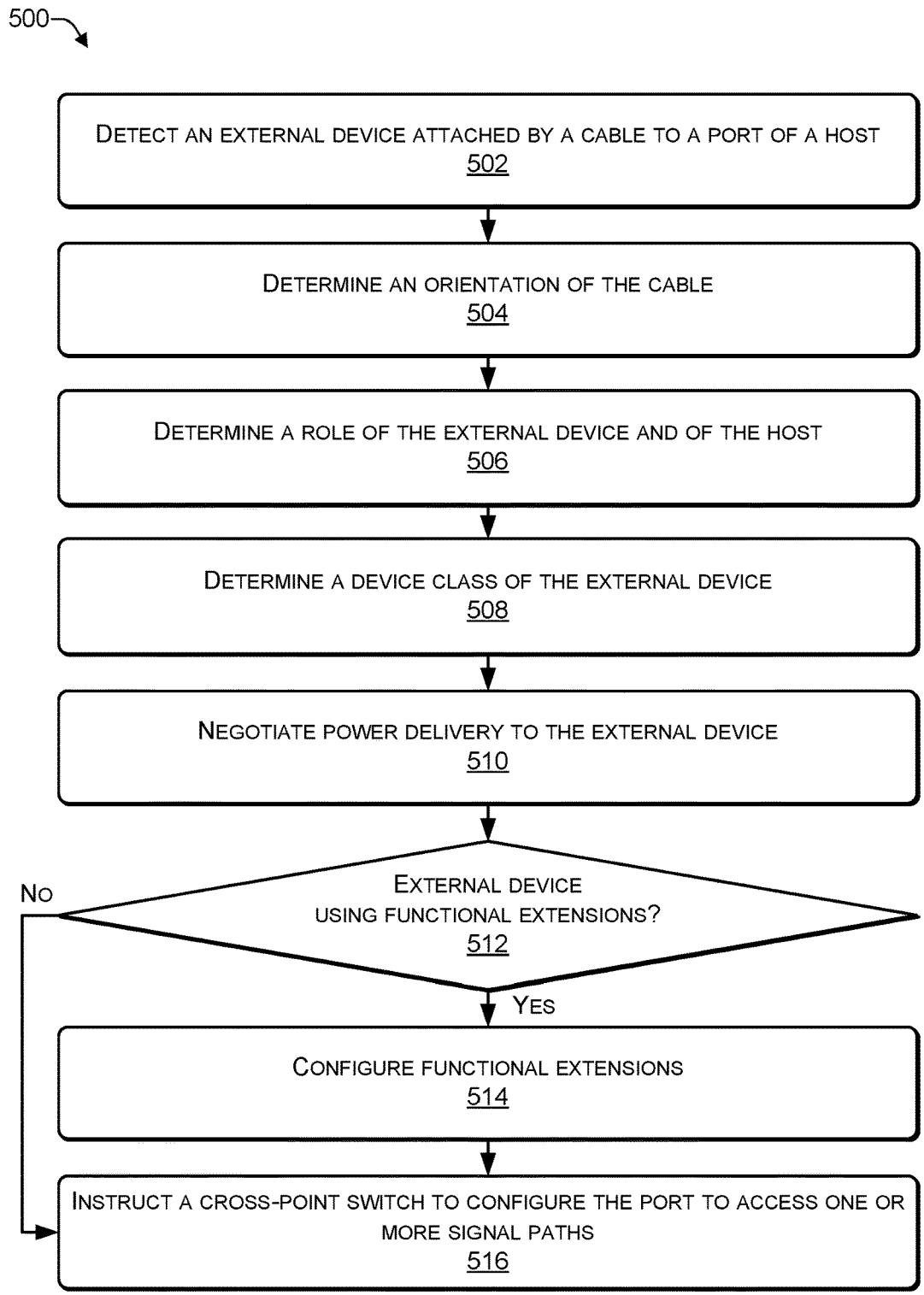
FIG. 5 is a flowchart of a process that includes instructing a cross-point switch according to some embodiments.

In the flow diagrams of FIGS. 4 and 5 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIG. 1, 2, or 3 as described above, although other models, frameworks, systems and environments may be used to implement these processes.

FIG. 4 is a flowchart of a process 400 that includes sending an instruction to a cross-point switch according to some embodiments. The custom logic device 110 of FIGS. 1 and 2 may perform the process 400.

At 402, a determination is made that an external device has been attached to a USB-C connector (e.g., of a host). At 404, the type of signal(s) that the device expects to send, receive, or send and receive are determined. At 406, an instruction is sent to a cross-point switch to connect the USB-C connector to one or more signal paths (e.g., of the host). For example, in FIG. 2, the custom logic device 110 may receive an indication, via the ICB 212(N), that the device 202(N) has been attached to the USB-C connector (e.g., port) 114(N). The custom logic device 110 may determine the type(s) of signals that the device 202(N) is configured to send, receive, or both send and receive. For example, the custom logic device 110 may determine that the device 202(N) expects to receive a video signal. The custom logic device 110 may send an instruction to the cross-point switch 112, using the control signal 214, to connect the USB-C 114(N) connector to a video signal (e.g., one or more of the DP 126 lines of FIG. 1).

Thus, a custom logic device in a computing device (e.g., a host device) may detect that an external device is connected to a USB-C connector based on information (e.g., provided by a port controller) on a configuration channel associated with the USB-C connector. The custom logic device may determine the type of signal(s) that the external device is capable of sending and/or receiving. The custom logic device may send a control signal to a cross-point switch to connect the USB-C connector to appropriate components of the computing device to enable the external device to send and/or receive the expected signals. In this way, a user connecting (e.g., plugging in) an external device to a USB-C connector causes the computing device to automatically configure the USB-C connector according to the functionality of the external device. For example, when a user connects a display device (e.g., a computer monitor) to a USB-C port on the computing device, the custom logic device may send an instruction to the cross-point switch to connect the USB-C port to video data being output by a component (e.g., a GPU or a CPU) of the computing device.

FIG. 5 is a flowchart of a process 500 that includes instructing a cross-point switch according to some embodiments. The custom logic device 110 of FIGS. 1 and 2 may perform the process 500.

At 502, the custom logic device may detect that an external device (e.g., UFP) is attached by a cable to a USB-C port of a host device (e.g., DFP). For example, as described above, when an external device is attached to a USB-C port of a host device, the change in the voltage level (e.g., a voltage drop) causes an indication on the CC associated with the USB-C port that an external device has been attached.

At 504, device port controller may determine an orientation of the cable. For example, in FIG. 3, the orientation of the cable may be determined based on whether the change in voltage level is detected on CC1 (A5 310) or CC2 (B5 334). The port controller 206(N) may communicate the cable orientation (e.g., A-orientation or B-orientation) to the custom logic device 110 via the ICB 212(N).

At 506, the custom logic device may determine a role of the external device and a role of the host device. For example, in FIG. 2, the custom logic device 110 may determine that the external device 202(N) is a UFP and the computing device 100 is a DFP. As another example, in FIG. 2, if the external device 202(N) is a second computing device (e.g., both the device 202(N) and the computing device 100 are DRP), then the custom logic device 110 may determine which of the devices 100, 202(N) has taken on the role of UFP and which has taken on the role of DFP.

At 508, the custom logic device may determine a device class of the external device. For example, in FIG. 2, after the device 202(N) is connected to the USB-C port 114(N), the custom logic device 110 may determine a role (e.g., one of the device classes in Table 1 above) of the device 202(N).

At 510, the custom logic device may negotiate power delivery to the external device. For example, in FIG. 2, after the device 202(N) is connected to the USB-C port 114(N), the custom logic device 110 may negotiate power delivery with the device 202(N).

At 512, a determination may be made whether the external device uses functional extensions (e.g., Alt mode). If a determination is made, at 512, that "yes" the external device is using functional extensions, then the process proceeds to 514 where the functional extensions are configured. The process then proceeds to 516. For example, in FIG. 2, after the device 202(N) is connected to the USB-C port 114(N), the custom logic device 110 may determine that the device 202(N) is a display device (e.g., computer monitor) using DP Alt mode and configure the functional extensions (e.g., number of DP lanes etc.).

If a determination is made, at 512, that "no" the external device is not using functional extensions, then the process proceeds to 516. For example, in FIG. 2, after the device 202(N) is connected to the USB-C port 114(N), the custom logic device 110 may determine that the device 202(N) is not using functional extensions.

At 516, the custom logic device may send an instruction to a cross-point switch to configure the USB-C port to access one or more signal paths (e.g., one or more of a video signal path, an audio signal path, a data signal path, a file system signal path, a power signal path, etc.). For example, in FIG. 2, after the device 202(N) is connected to the USB-C port 114(N), the custom logic device 110 may send an instruction to the cross-point switch 112 to configure the USB-C port 114(N) based on one or more of the role of the device 202(N), the role of the computing device 100, a device class of the device 202(N), a power delivery associated with the device 202(N), functional extensions (e.g., an Alt mode) associated with the device 202(N), another characteristic associated with the device 202(N), or any combination thereof. To illustrate, if the custom logic device 110 determines that the device 202(N) is a display device using DP Alt mode and send an instruction to the crosspoint switch 112 to connect the USB-C port 114(N) to the appropriate number of DP lanes, the appropriate internal power rails (e.g., to satisfy the negotiated power delivery), etc.

Thus, a custom logic device in a computing device may detect that an external device is connected to a USB-C connector based on information (e.g., provided by a port controller) on a configuration channel associated with the USB-C connector. The custom logic device may determine an orientation of the cable, a role of the external device, a device class of the external device, negotiate power delivery (e.g., voltage and amperage to be provided) with the external device, the type of signal(s) that the external device is capable of sending and/or receiving, other characteristics of the external device, or any combination thereof. The custom logic device may send a control signal to a cross-point switch to connect the USB-C connector to appropriate signal paths (e.g., data paths, power paths, etc.) within the computing device to enable the external device to send and/or receive the expected signals. In this way, a user connecting (e.g., plugging in) an external device to a USB-C connector causes the computing device to automatically configure the USB-C connector according to the functionality of the external device. For example, when a user connects a display device (e.g., a computer monitor) to a USB-C port on the computing device, the custom logic device may send an instruction to the cross-point switch to connect the USB-C port to one or more DP lanes being output by a component (e.g., a GPU or a CPU) of the computing device. The custom logic device may determine whether the display device is configured to receive power, negotiate the delivery of power, and send an instruction to the cross-point switch to connect the USB-C port to the amount of power that was negotiated to be delivered.

Figure 6:
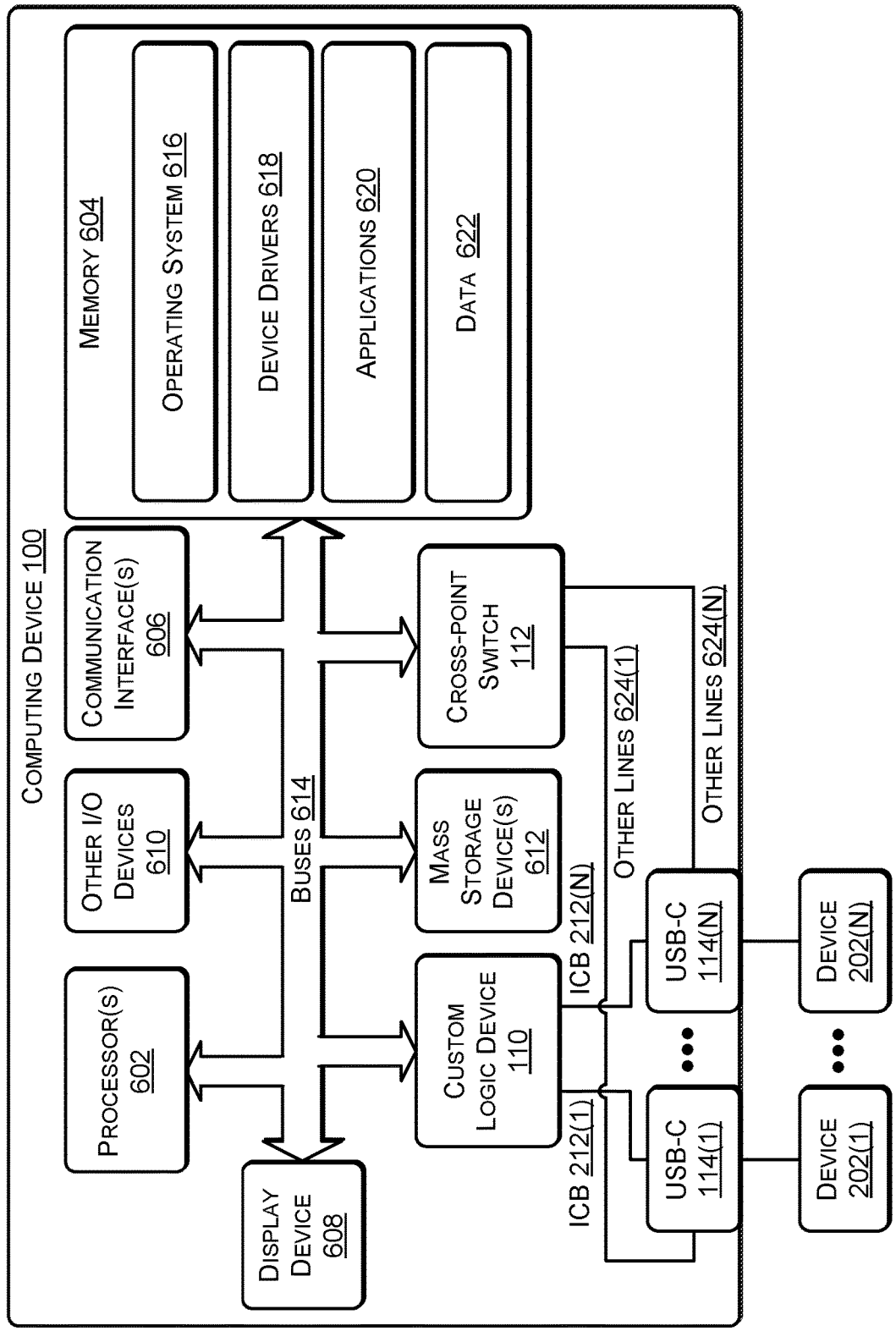
FIG. 6 illustrates an example configuration of a computing device that can be used to implement the systems and techniques described herein.

FIG. 6 illustrates an example configuration of the computing device 100 that can be used to implement the systems and techniques described herein. The computing device 100 may include one or more processors 602, a memory 604, communication interfaces 606, a display device 608, other input/output (I/O) devices 610, and one or more mass storage devices 612, configured to communicate with each other, such as via system buses 614 or other suitable connection. The system buses 614 may include multiple buses, such as memory device buses, storage device buses, power buses, video signal buses, and the like. A single bus is illustrated in FIG. 6 purely for ease of understanding.

The processors 602 are one or more hardware devices that may include a single processing unit or a number of processing units, all of which may include single or multiple computing units or multiple cores. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processor 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processor 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a media capable of storing computer-readable, processor-executable program instructions as computer program code that can be executed by the processor 602 as a particular machine configured for carrying out the operations and functions described in the implementations herein.

The computing device 600 may also include one or more communication interfaces 606 for exchanging data via the network 118 with network elements 616. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 606 can also provide communication with external storage (not shown), such as in a storage array, network attached storage, storage area network, or the like. A display device 608, such as a monitor may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

The computer storage media, such as memory 604 and mass storage devices 612, may be used to store software and data. For example, the computer storage media may be used to store an operating system 616, device drivers 618, applications 620, and data 622.

The custom logic device 110 may monitor the configuration channels associated with multiple (e.g., N, where N>1) USB-C connectors. For example, the custom logic device 110 may monitor the ICB 212(1) associated with the USB-C connector 114(1) and the ICB 212(N) associated with the USB-C connector 114(N). In response to detecting that an external device, e.g., one of the devices 202(1) to 202(N), has been connected to a particular USB-C connector, the custom logic device 110 may determine what type of signal(s) the external device is configured send and/or receive. For example, the custom logic device 110 may determine a role associated with the external device, a device class associated with the external device, power delivery expectations of the external device, other characteristics associated with the external device, or any combination thereof. Based on this information (e.g., role, device class, power delivery, etc.), the custom logic device 110 may send an instruction to the cross-point switch 112 to connect other lines 624 associated with the USB-C connectors 114 with other components of the computing device 100 to enable the external device to send and/or receive the expected type of signal(s). For example, after the device 202(1) is connected to the USB-C 114(1), the custom logic device 110 may send an instruction to the cross-point switch 112 to connect one or more of the other lines 624(1) to appropriate components of the computing device 100. After the device 202(N) is connected to the USB-C 114(N), the custom logic device 110 may send an instruction to the cross-point switch 112 to connect one or more of the other lines 624(N) to appropriate components of the computing device 100. The other lines 624 may include one or more of the lines described in FIG. 3, excluding the CC lines A5 310 and B5 334.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving, by a logic device, an indication from a port controller of a computing device that an external device is connected via a cable to a universal serial bus (USB) Type-C port of the computing device, wherein the computing device comprises:
the logic device;
a cross-point switch coupled to the logic device; and
the USB Type-C port;
after receiving the indication, determining, by the logic device, a device class of the external device;
after determining, the device class of the external device, determining, by the logic device, a role of the external device;
in response to determining, based on the role and the device class, that the external device comprises a display device, sending, by the logic device, an instruction to the cross-point switch to connect at least a video bus of the computing device to the USB Type-C port;
in response to determining, based on the role and the device class, that the external device comprises a storage device, sending, by the logic device, an instruction to the cross-point switch to connect at least a device bus to the USB Type-C port; and
in response to determining, based on the role and the device class, that the external device is requesting that power be provided, sending by the logic device, an instruction to the cross-point switch to connect at least a power bus to the USB Type-C port.

2. The method of claim 1, further comprising:
determining a voltage to provide the external device that is approximately between 5 volts and 20 volts;
determining an amperage to provide the external device that is approximately between 100 milliamps and 5 amps; and
instructing, by the logic device, the cross-point switch to connect the power bus of the computing device to the USB Type-C port to provide the voltage and the amperage.

3. The method of claim 1, further comprising:
determining that the external device is using a display port (DP) alternate mode; and
instructing the cross-point switch to provide one or more DP lanes to the USB Type-C port.

4. The method of claim 1, wherein the logic device comprises an embedded controller.

5. The method of claim 1, wherein the role comprises one of a downward facing port or an upward facing port.

6. The method of claim 1, further comprising:
determining that the external device is using functional extensions; and
configuring the USB Type-C port to support the functional extensions.

7. The method of claim 1, wherein the logic device monitors a communications channel associated with the USB Type-C port to determine one or more types of signals that the external device is configured to send, receive, or send and receive.

8. A computing device comprising:
one or more processors;
one or more memory storage devices;
one or more universal serial bus (USB) Type-C ports;
a device bus;
a cross-point switch; and
a logic device configured to perform operations comprising:
receiving an indication from a port controller that an external device is connected via a cable to a particular universal serial bus (USB) Type-C port of the one or more USB Type-C ports;
in response to receiving the indication, determining a role of the external device;
in response to determining the role of the external device, determining a device class of the external device; and
in response to determining, based on the role and the device class, that the external device comprises a display device, sending an instruction to the cross-point switch to connect at least a video bus to the USB Type-C port;
in response to determining, based on the role and the device class, that the external device comprises a storage device, sending, by the logic device, an instruction to the cross-point switch to connect at least a device bus to the USB Type-C port; and
in response to determining, based on the role and the device class, that the external device is requesting that power be provided, sending by the logic device, an instruction to the cross-point switch to connect at least a power bus to the USB Type-C port.

9. The computing device of claim 8, wherein the role comprises one of a downward facing port or an upward facing port.

10. The computing device of claim 8, wherein the device class comprises one of an audio device class, a communications device class, a human interface device class, a physical interface device class, an image device class, a printer device class, a mass storage device class, a USB hub device class, a smart card device class, a security device class, a video device class, a personal healthcare device class, an audio/video device class, a diagnostic device class, a wireless controller device class, an application-specific device class, or a vendor specific device class.

11. The computing device of claim 8, wherein the logic device comprises an embedded controller.

12. The computing device of claim 8, wherein the operations further comprise:
determining a voltage to provide the external device that is approximately between 5 volts and 20 volts;
determining an amperage to provide the external device that is approximately between 100 milliamps and 5 amps; and
instructing the cross-point switch to connect the power bus of the computing device to the particular USB Type-C port to provide the voltage and the amperage.

13. The computing device of claim 8, wherein the operations further comprise:
determining that the external device is using a display port (DP) alternate mode; and
instructing the cross-point switch to provide one or more DP lanes to the particular USB Type-C port.

14. An embedded controller programmed with instructions to perform operations comprising:
receiving an indication from a port controller that an external device is connected via a cable to a universal serial bus (USB) Type-C port of a computing device, wherein the computing device comprises:
the embedded controller,
a cross-point switch coupled to the embedded controller,
the USB Type-C port, and
a device bus;
in response to receiving the indication, determining a device class of the external device;
in response to determining the device class, determining a role of the external device;
in response to determining, based on the role and the device class, that the external device comprises a display device, instructing the cross-point switch to connect at least a video bus to the USB Type-C port;
in response to determining, based on the role and the device class, that the external device comprises a storage device, instructing the cross-point switch to connect a device bus to the USB Type-C port; and
in response to determining, based on the role and the device class, that the external device is requesting that power be provided, instructing the cross-point switch to connect at least a power bus to the USB Type-C port.

15. The embedded controller of claim 14, wherein the role comprises one of a downward facing port or an upward facing port.

16. The embedded controller of claim 14, the operations further comprising:
receiving, over a configuration channel associated with the USB Type-C port, data indicating one or more types of signals that the external device is configured to communicate, wherein the data is sent by a port controller associated with the USB Type-C port.

17. The embedded controller of claim 14, the operations further comprising:
negotiating power delivery to the external device.

18. The embedded controller of claim 17, wherein negotiating the power delivery to the external device comprises:
negotiating a voltage that is approximately between 5 volts and 20 volts;
negotiating an amperage that is approximately between 100 milliamps and 5 amps; and
instructing the cross-point switch to connect the power bus of the computing device to the USB Type-C port to provide the voltage and the amperage.

19. The embedded controller of claim 14, the operations further comprising:

determining that the external device is using an alternate mode; and instructing the cross-point switch to connect the USB Type-C port to support the alternate mode.

20. The embedded controller of claim 14, wherein the device class of the external device comprises one of: an audio device class, a communications device class, a human interface device class, a physical interface device class, an image device class, a printer device class, a mass storage device class, a USB hub device class, a smart card device class, a security device class, a vide device class, a personal healthcare device class, an audio/video device class, a diagnostic device class, a wireless controller device class, an application-specific device class, or a vendor specific device class.

* * * * *